(12) United States Patent
Dietrich (10) Patent No.: US 11,555,688 B2
(45) Date of Patent: Jan. 17, 2023

(54) DEVICE HAVING TWO MUTUALLY SPACED SENSOR LOOPS FOR DETERMINING THE ANGLE OF A ROTATING COMPONENT

(71) Applicant: SCHAEFFLER TECHNOLOGIES AG & CO. KG, Herzogenaurach (DE)

(72) Inventor: Markus Dietrich, Oberkirch (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 480 days.

(21) Appl. No.: 16/614,649

(22) PCT Filed: May 3, 2018

(86) PCT No.: PCT/DE2018/100422
§ 371 (c)(1),
(2) Date: Nov. 18, 2019

(87) PCT Pub. No.: WO2018/215017
PCT Pub. Date: Nov. 29, 2018

(65) Prior Publication Data
US 2020/0109936 A1      Apr. 9, 2020

(30) Foreign Application Priority Data

May 24, 2017   (DE) .......................... 102017111342.8

(51) Int. Cl.
*G01B 7/30*    (2006.01)
*G01D 5/48*    (2006.01)
*F16D 48/06*   (2006.01)

(52) U.S. Cl.
CPC ............... *G01B 7/30* (2013.01); *G01D 5/485* (2013.01); *F16D 48/064* (2013.01)

(58) Field of Classification Search
CPC .......... F16D 48/064; G01B 7/30; G01D 5/485
See application file for complete search history.

(56) References Cited

U.S. PATENT DOCUMENTS

| | | | |
|---|---|---|---|
| 4,035,762 A * | 7/1977 | Chamuel | ................ G01D 5/247 367/125 |
| 6,528,990 B1 | 3/2003 | Nyce | |
| 10,385,934 B2 | 8/2019 | Dietrich | |

FOREIGN PATENT DOCUMENTS

| | | |
|---|---|---|
| CN | 1809725 A | 7/2006 |
| DE | 19810158 A1 | 9/1999 |

(Continued)

*Primary Examiner* — Jay Patidar (57) ABSTRACT

A device having two mutually spaced sensor loops is provided. The device includes a magnetostrictive sensor structure coupled to a plurality of transmitters and a plurality of receivers, and along which a magnet that is secured to the rotating component moves. Each sensor loop has a shape corresponding to a rotating direction of the rotating component. Two saturation zones are in both sensor loops. Each transmitting element is provided for simultaneously coupling two current pulses in opposite direction into one respective sensor loop. Each receiving element is positioned to receive a reflected pulse by the magnet at the respective saturation zone. The receiving elements are connected to evaluation electronics configured to for determine an angular position of the rotating component based on transit times for the current pulse to travel along the respective sensor loop from the respective transmitting element to the respective saturation zone and for each reflected pulse to travel along the respective sensor loop from the respective saturation zone to the respective receiving element.

20 Claims, 11 Drawing Sheets

(56) References Cited

FOREIGN PATENT DOCUMENTS

| | | |
|---|---|---|
| DE | 202012008717 U1 | 12/2013 |
| DE | 102013213948 A1 | 2/2014 |
| DE | 102013222366 A1 | 5/2014 |
| JP | H02163615 A | 6/1990 |
| JP | H04335102 A | 11/1992 |
| JP | H0658748 A | 3/1994 |
| JP | H07306030 A | 11/1995 |
| JP | H10185549 A | 7/1998 |
| JP | 2001153639 A | 6/2001 |
| JP | 2015524933 A | 8/2015 |
| WO | 2009088378 A1 | 7/2009 |

\* cited by examiner

DEVICE HAVING TWO MUTUALLY SPACED SENSOR LOOPS FOR DETERMINING THE ANGLE OF A ROTATING COMPONENT

CROSS-REFERENCE TO RELATED APPLICATIONS

This application is the U.S. National Phase of PCT/DE2018/100422 filed May 3, 2018, which claims priority to DE 10 2017 111 342.8 filed May 24, 2017, the entire disclosures of which are incorporated by reference herein.

TECHNICAL FIELD

This disclosure relates to a device for determining an angle of a rotating component, comprising a magnetostrictive sensor structure, which is coupled to a transmitting and receiving element and along which a magnet secured to the moving component moves, wherein the transmitting and the receiving element are connected to evaluation electronics for determining a position of the moving component from a transit time between the transmitting element and a saturation zone and back from the saturation zone to the receiving element, wherein the transmitted signal is reflected at the saturation zone produced by the magnet in the magnetostrictive sensor structure.

BACKGROUND

It is known that angular rotor position measurements are usually carried out using magnetic measuring methods. DE 102013 213 948A1 discloses a method for determining a position of an electric motor, in which a position signal of a rotor of the electric motor is picked up by a sensor arranged outside an axis of rotation of the electric motor on a stator of the electric motor, which signal is evaluated with regard to the position of the electric motor by an evaluation unit.

DE 10 2013 222 366 A1 discloses a method for determining a position of an electric motor, in which the detection of the rotor position is realized with a high level of certainty. In this case, depending on a transmission distance between the sensor unit and evaluation unit, the position signal is transmitted to the evaluation unit by means of an SPI protocol signal for short transmission distances and/or by means of a PWM signal for longer transmission distances. In terms of the magnet costs and the susceptibility to tolerances, these magnetic measuring methods are not easy to integrate in certain systems in which an angle of a rotating component is to be measured. In this case, the precision of the angular position measurement depends very highly on dynamic tolerances with regard to the movement of the magnet with respect to the sensor.

Sensors by the company Littlefuse or MTS are known, which enable a linear displacement measurement by means of transit time. In this case, the transit time of a pulse is measured in a linearly extending magnetostrictive sensor element, wherein a pulse generator and a receiver are arranged on this magnetostrictive sensor element. A magnet is used, which merely forms a saturation zone in the magnetostrictive sensor element. Magnetization errors, inhomogeneities, flux variance owing to manufacturing tolerances and the temperature coefficient can be approximately disregarded.

This disclosure is based on the object of providing a device for determining an angle of a rotating component, which makes use of the advantages of the linear transit time measurement via the magnetostrictive sensor element.

SUMMARY

According to an embodiment, the object is achieved in that the magnetostrictive sensor structure comprises two sensor loops located at a mutual spacing and the shape of each sensor loop is adapted to a movement direction of the rotating component, wherein a common transmitting element is provided for simultaneously coupling a pulse into each of the two sensor loops, in the vicinity of which transmitting element a receiving element for each sensor loop is positioned to receive the pulse reflected by the saturation zone of the respective sensor loop, wherein the receiving elements are connected to the evaluation electronics to determine the angular position from a ratio of the two transit times in both sensor loops. This has the advantage that, as a result of the curved arrangement of two sensor loops, a pulse measurement and therefore transit time measurement can be carried out in both sensor loops in each case, wherein the pulse is reflected in each case by the saturation zone of the corresponding magnetostrictive sensor loop. A measurement of the magnetic flux or the direction of the magnetic vector is omitted entirely since only the saturation point is detected. The transit time measurement can thus also be used in a rotational method. Such a device is immune to magnetic interference fields and enables an angular measurement which is tolerant with regard to tolerances and environmental influences.

A spacing of the magnet from the magnetostrictive sensor structure advantageously determines the width of the saturation zone. With a large spacing, the flux density in the magnetostrictive sensor loop is reduced, whereby the saturation zone is configured to be narrower, whereas when the spacing between the magnet and the sensor structure is reduced, the saturation zone becomes wider. The transit time of the pulses can be set via this width since the transit time is shortened with wider saturation regions.

In one configuration, the magnet is positioned such that it is tilted with respect to the magnetostrictive sensor structure. It is thus possible to set asymmetric saturation zones for a pulse.

In a further development, the magnet secured to the rotating component is formed as a magnetic ring or from two opposing block magnets. Since it is only necessary to generate two diametrically opposed saturation zones, the use of simple block magnets is particularly cost-effective. In contrast, the use of a magnetic ring generates a continuous magnetic field progression.

The sensor structure is advantageously formed in an electronic element generating the pulse and comprising the evaluation electronics. This enables particularly simple and small devices to be generated.

The sensor structure is alternatively formed in a printed circuit board on which the electronic element generating the pulse and comprising the evaluation electronics is positioned. Although the electronic component and the support element of the electronic component therefore represent separate components, since the support element, as such, is always present in the device, an additional arrangement for supporting the sensor structure is omitted, which reduces the size of the device.

In one variant, the inner sensor loop and the outer sensor loop each comprise two curved sensor elements. Via these two curved sensor elements, a redundant measurement is possible since the monitoring of the transit time can take place both in the inner sensor loop and in the outer sensor loop. A dead zone within the magnetostrictive sensor structure is avoided by this use of two approximately circular saturation loops.

In one configuration, the curved sensor elements of the two sensor loops are formed to be semicircular, wherein the semicircular sensor elements of a sensor loop are arranged to resemble a circle. Such a device enables a 360° sensor to be realized in a simple manner so that a complete revolution of the rotating component can be detected.

In one variant, the end pairs of the inner and the outer sensor loop are arranged offset from one another by 90°. Such an arrangement enables redundant signals to be generated through the use of both sensor loops, depending on the form of the saturation zone. This takes place in particular when the magnet is arranged such that a saturation region is formed between an end pair of the outer sensor loop and an end pair of the inner sensor loop.

In one alternative, the saturation region is formed between the two receiving elements of an end pair of the inner or the outer sensor loop. If this is the case, only one of the two sensor loops can be used for the transit time measurement. However, the inactive other part can still be used to monitor operation, but not for exact position determination.

In one embodiment, each sensor loop has only one curved element, which extends over more than 180°, wherein the end pair of the inner sensor loop is covered by the outer sensor loop. In this arrangement, provided that the overlap of the inner and the outer sensor loop is always greater than the saturation zone, the inner and the outer sensor loop can be used for measuring in both directions.

To enable the transit time of the pulse to be lengthened accordingly, and therefore to increase the accuracy of the position determination of the rotating component, the curved elements of the sensor loops are formed in a meandering manner.

BRIEF DESCRIPTION OF THE DRAWINGS

Several embodiments are explained in more detail with reference to the figures illustrated in the drawing, which show.

DETAILED DESCRIPTION

Figure 1:
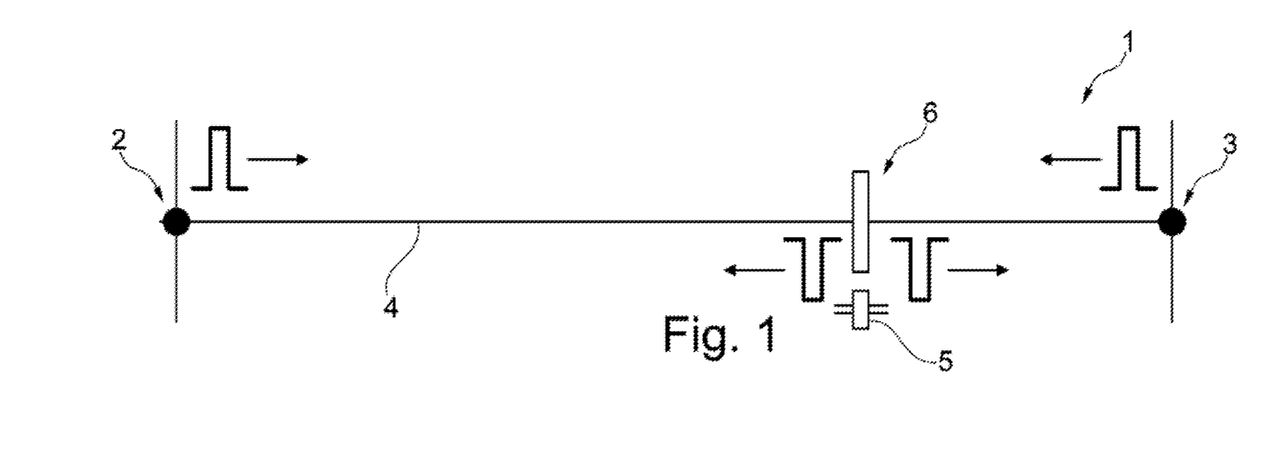
FIG. 1: an operating principle for the transit time measurement.

FIG. 1 illustrates a first exemplary embodiment of an operating principle for transit time measurement with a magnetostrictive displacement transducer, which measures an angle of a rotating component. The magnetostrictive displacement transducer 1 serves for measuring the distance between two points 2, 3 between which a waveguide, formed as a magnetostrictive sensor structure 4, is arranged, along which waveguide a permanent magnet 5 moves. A respective current pulse is coupled into the magnetostrictive sensor structure 4 at the points 2, 3. The current generates a circular magnetic field, which is concentrated in the magnetostrictive sensor structure 4 owing to the magnetically soft properties thereof. At the displacement point to be measured, the movable permanent magnet 5 is used as a position encoder whereof the magnetic field lines extend at a right angle to the pulse magnetic field and are likewise concentrated in the magnetostrictive sensor structure 4. In the region of the magnetostrictive sensor structure 4 in which both magnetic fields are superimposed, an elastic deformation is produced by magnetostriction, which corresponds to a saturation zone 6. The pulses which are supplied in each case into the points 2, 3 are reflected at this saturation zone 6. The reflected pulses are received again at the points 2 and 3, and their transit time determined. The position of the permanent magnet 5 which is secured to the rotating component is concluded from the ratio of the two transit times.

Figure 2:
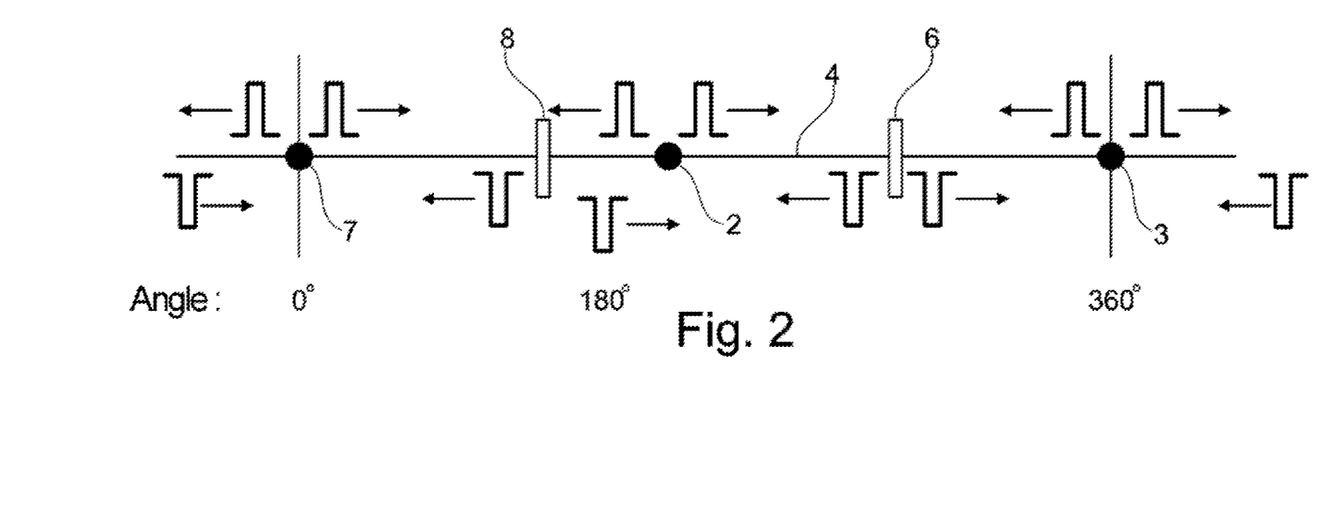
FIG. 2: a further operating principle for the transit time measurement.

FIG. 2 shows a further operating principle for the transit time measurement, in which a plurality of points 2, 3, 7 are used for pulse coupling and measurement. In this case, each point 2, 3, 7 corresponds to a predetermined angle, for example the point 7 to an angle of 0°, the point 3 to an angle of 180° and the point 2 to an angle of 360°. Pulses are coupled at each point 2, 3, 7 in opposite directions of the magnetostrictive sensor structure 4 and reflected by the saturation zones 6, 8 produced in each case between two points 2, 3 or 3, 7 in the sensor structure 4. Since a fixed angular position is associated with the supply and, at the same time, receiving points 2, 3, and 7 in each case, the position of the permanent magnet 5 can be concluded redundantly from the different transit time measurements.

Figure 3:
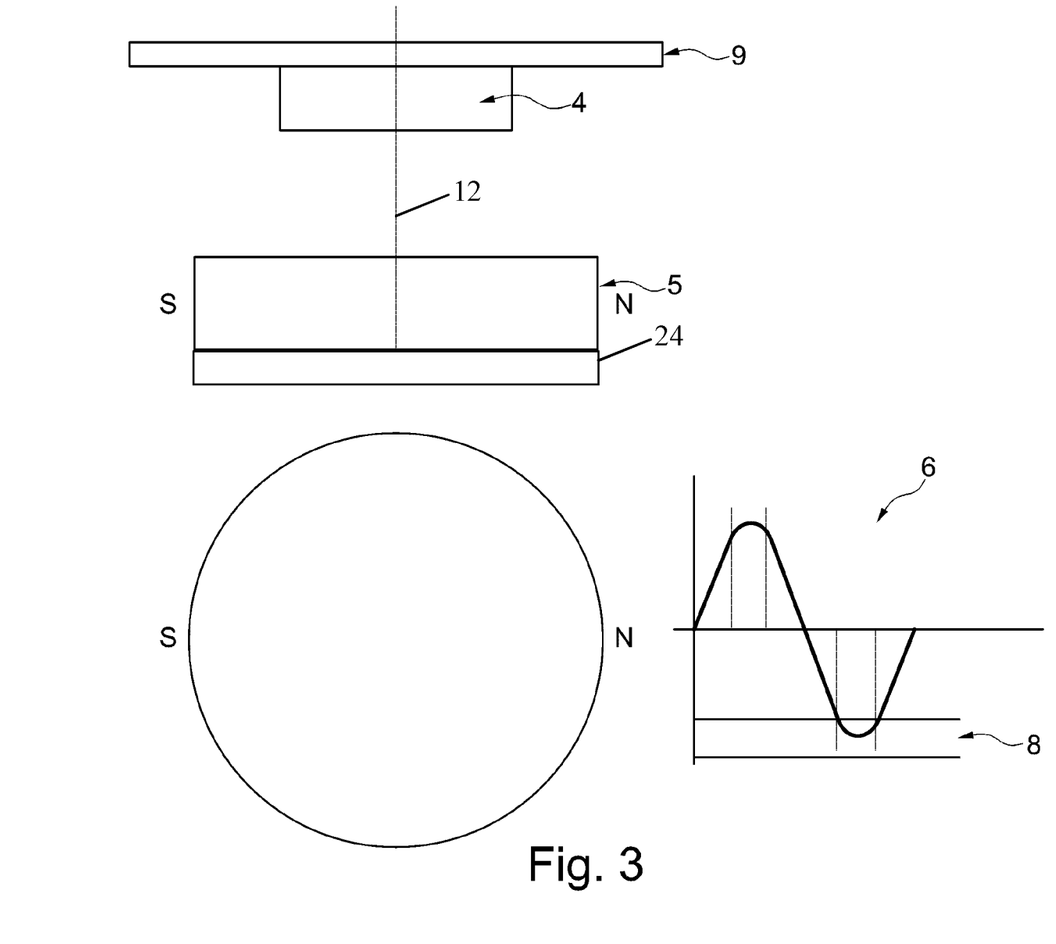
FIG. 3: an exemplary embodiment for generating a saturation zone in a magnetostrictive sensor structure.

FIG. 3 illustrates an exemplary embodiment for generating the saturation zone of the magnetostrictive sensor structure 4. In this case, the magnetostrictive sensor structure 4 is secured on a printed circuit board 9. Opposite this, the permanent magnet 5 is arranged centrically with respect to the axis of rotation 12, wherein the left side represents the south pole S and the right side the north pole N. Saturation zones 6, 8 form in the manner already described, wherein these saturation zones 6, 8 are understood to refer to a magnetization whereof the value is not exceeded by an increase in the outer magnetic field strength.

Figure 4:
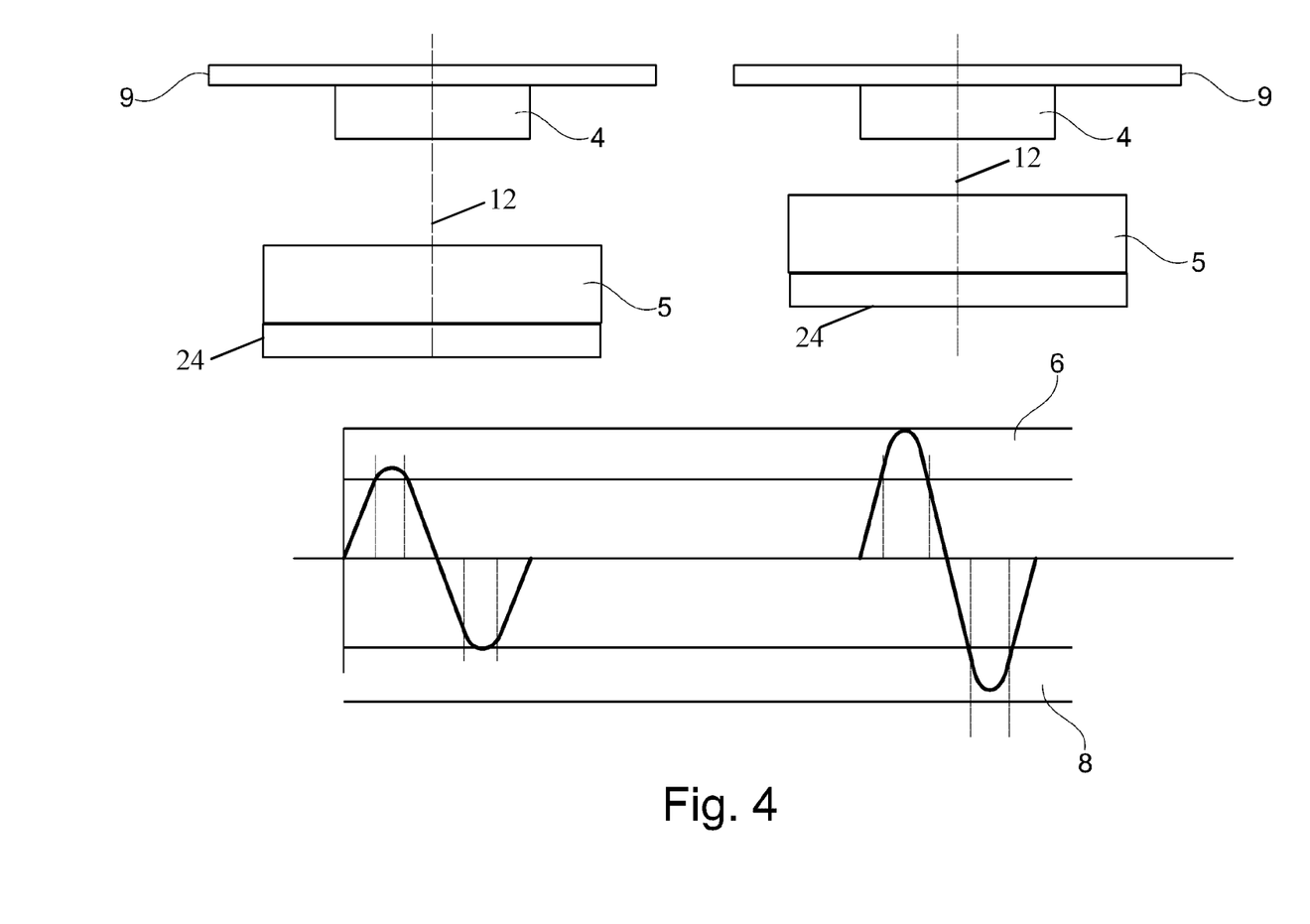
FIG. 4: a further exemplary embodiment for generating a saturation zone in a magnetostrictive sensor structure.

With a centric arrangement of the permanent magnet 5 in relation to the magnetostrictive sensor structure 4, saturation zones 6, 8 with the same width are produced in the signal of the reflected pulse. This width of the saturation zones 6, 8 can vary due to a change in the spacing between the permanent magnet 5 and the magnetostrictive sensor structure 4, as illustrated in FIG. 4. The left of FIG. 4 shows a greater spacing between the permanent magnet 5 and the magnetostrictive sensor structure 4, whereby both pulses have a smaller saturation spacing. If the permanent magnet 5 is moved closer to the magnetostrictive sensor structure 4, as illustrated in the left of FIG. 4, the saturation zone 6, 8 widens as a result of a higher flux density in the magnetostrictive sensor structure 4.

Figure 5:
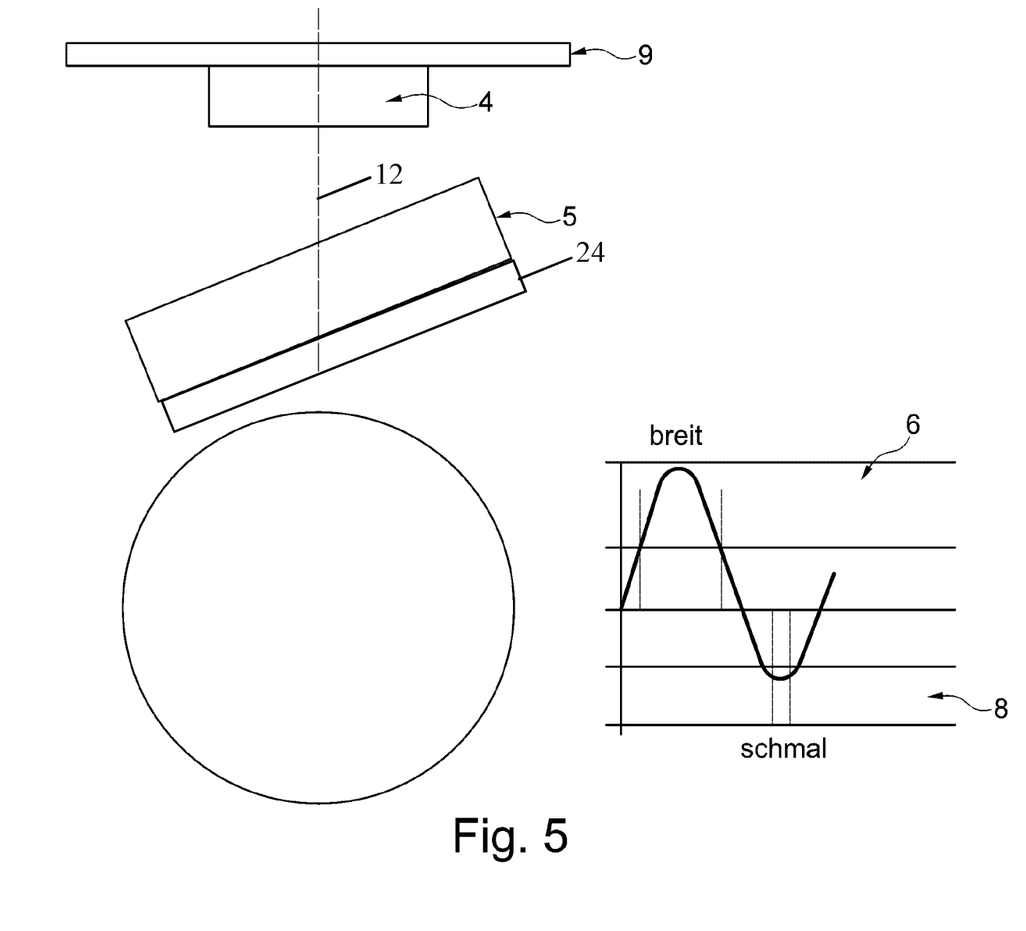
FIG. 5: a further exemplary embodiment for generating a saturation zone in a magnetostrictive sensor structure.

Different widths of the saturation zones 6, 8 can be set by tilting the permanent magnet 5 with respect to the magnetostrictive sensor structure 4, as clarified in FIG. 5. In this case, the tilting of the permanent magnet 5 produces asymmetrically wide saturation zones 6, 8.

Figure 6:
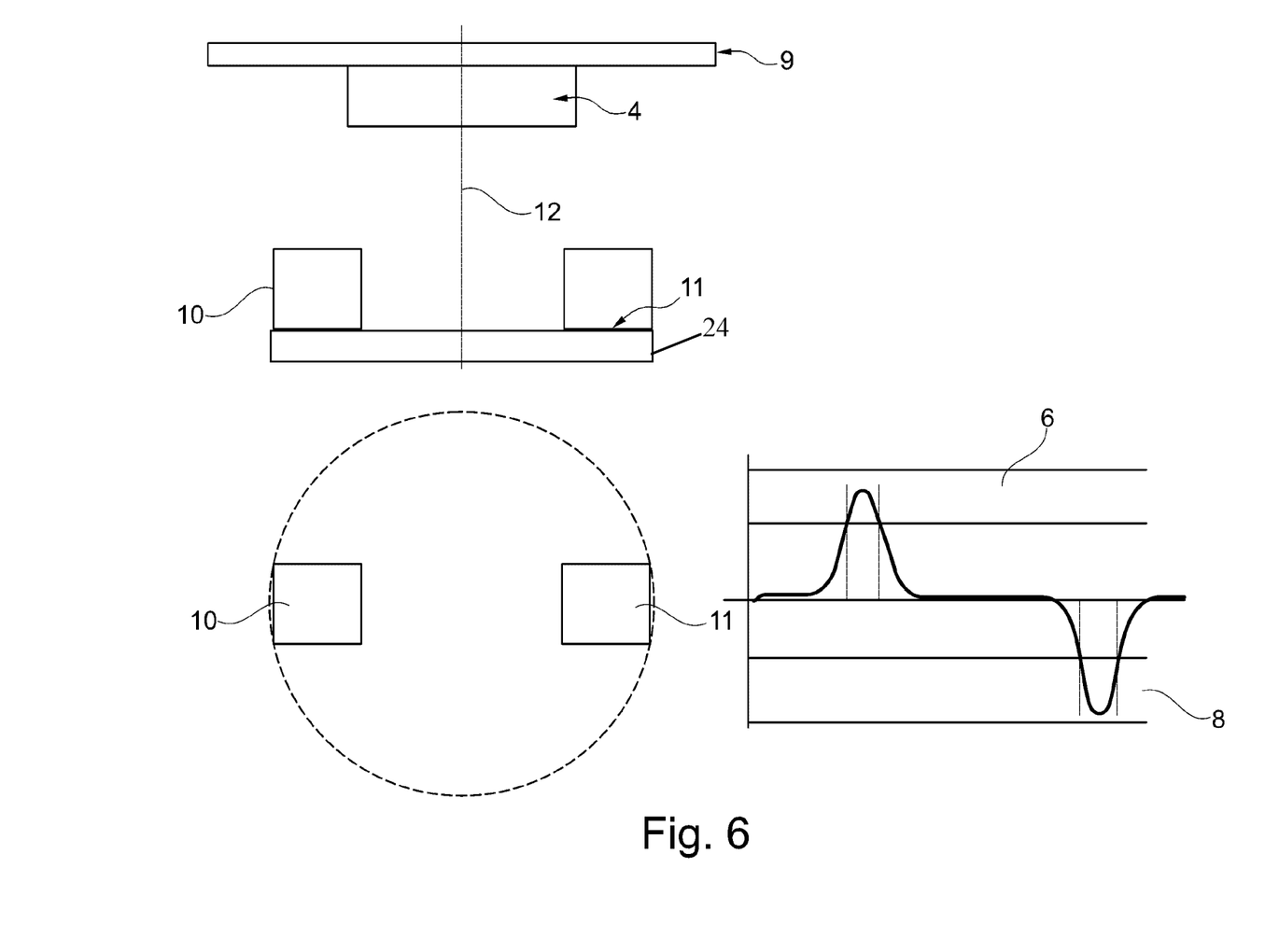
FIG. 6: an exemplary embodiment for the use of block magnets.

In the examples above, it was assumed that the permanent magnet 5 is a magnetic ring which is secured to the rotating component for which the position is to be detected. However, the use of a continuous magnetic field progression, as generated by the magnetic ring, is not essential for the angular measurement. Therefore, instead of the magnetic ring, two block magnets 10, 11 can also be arranged opposite the magnetostrictive sensor structure 4, which block magnets have an opposing polarity in their positions and the same spacing from the axis of rotation 12. Via these two block magnets 10, 11, only two saturation zones 6, 8 for the pulse measurement are generated, which are produced with the opposing arrangement of the two block magnets 10, 11.

Figure 7:
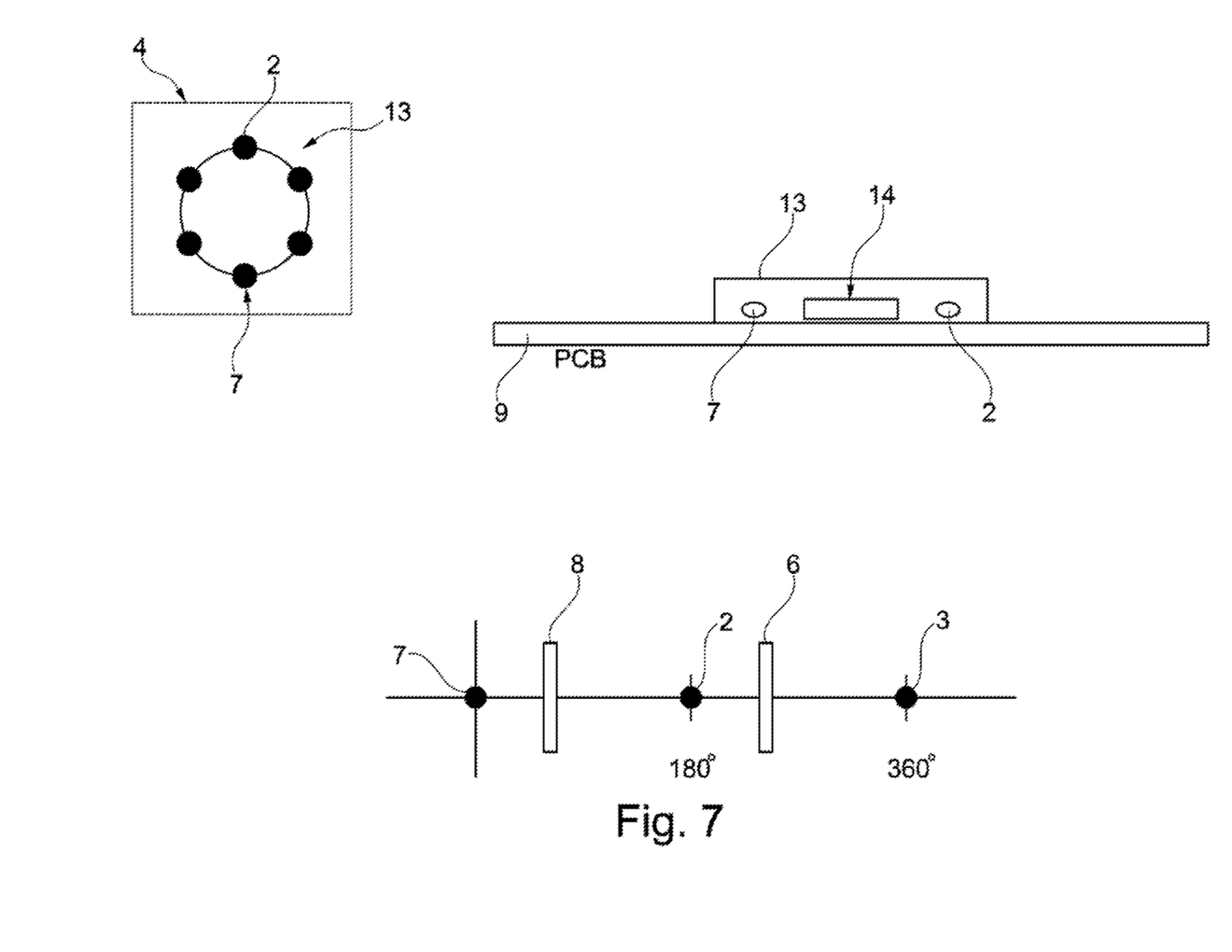
FIG. 7: an exemplary embodiment for an arrangement of the magnetostrictive structure.

FIG. 7 shows an exemplary embodiment for the arrangement of the magnetostrictive sensor structure 4. In this case, the sensor structure 4 is illustrated in simplified form as a ring and has points 2, 3, 7 at predetermined spacings for coupling two pulses running in opposite directions and for receiving the reflected pulses. Such a sensor structure 4 is formed in a chip 13, wherein the center of the chip 13 is formed by an electronic unit 14 for pulse generation and evaluation. In this case, the sensor structure 4 surrounds the electronic unit 14. Such a chip 13 is secured on the printed circuit board 9. Since fixed angular degrees are associated with the predetermined points 2, 3, 7, as already explained above, pulse coupling and the receipt of the reflected pulses takes place, for example, at 0° and at 360°, wherein the saturation zones 6, 8 produced by the permanent magnets 5 are located between 0° and 180° or 180° and 360° of the sensor structure 4. By arranging the sensor structure 4 in the chip 13, a universally formed chip is realized, which can be adapted to a wide variety of applications.

Figure 8:
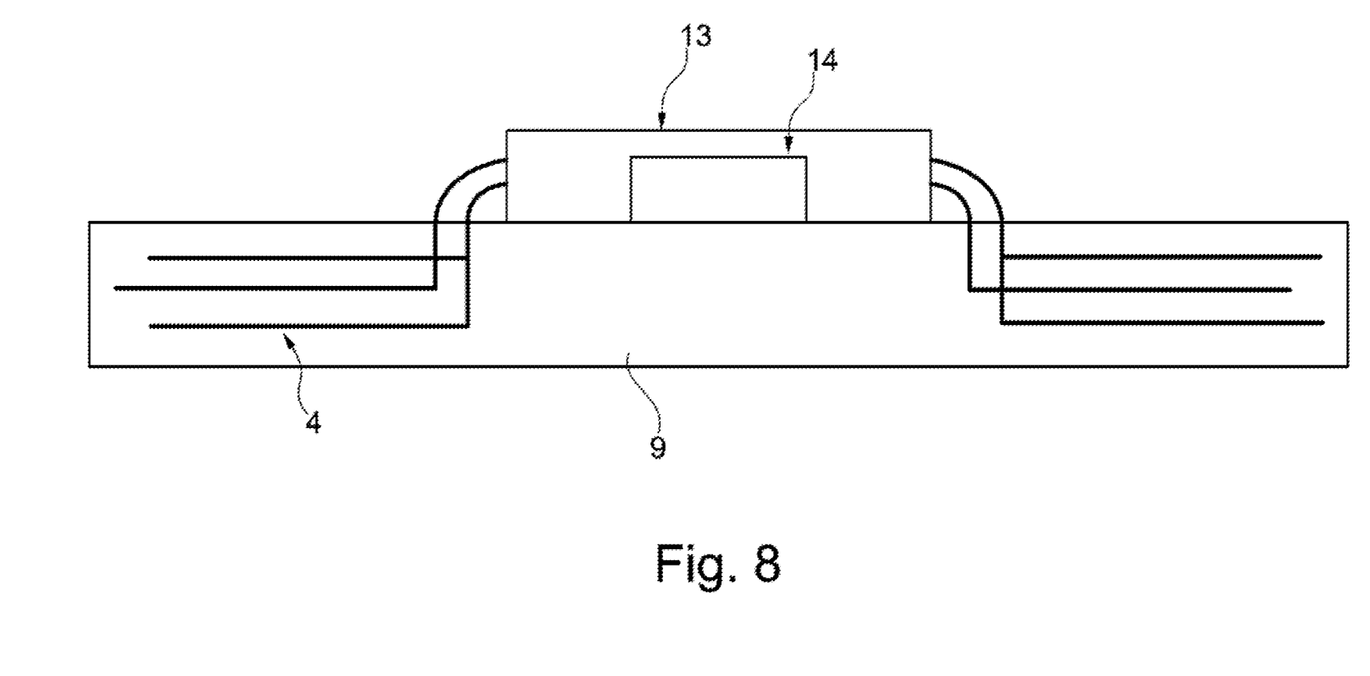
FIG. 8: a further exemplary embodiment for the arrangement of the magnetostrictive structure.

In an alternative exemplary embodiment, as illustrated in FIG. 8, the chip 13, which supports the electronic unit 14 for pulse generation and pulse evaluation, is positioned on the printed circuit board 9 whilst the sensor structure 4 is formed within the printed circuit board 9 and connected to the chip 13.

Figure 9:
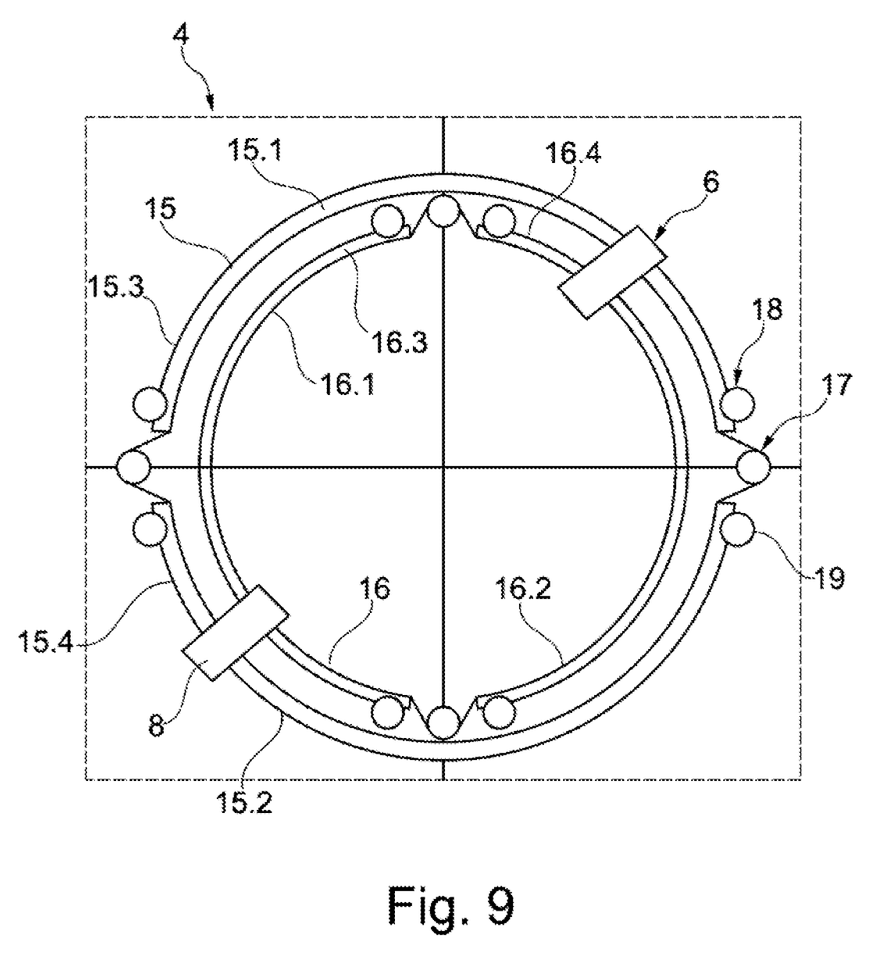
FIG. 9: an exemplary embodiment of a magnetostrictive sensor structure for a 360° sensor.

FIG. 9 illustrates an exemplary embodiment of a magnetostrictive sensor structure 4 of a 360° sensor. For such a sensor, the sensor structure consists of two sensor loops 15, 16, wherein each sensor loop 15, 16 comprises two semicircular sensor elements 15.1, 15.2 or 16.1, 16.2. The two sensor elements 16.1, 16.2 of the inner sensor loop 16 are arranged approximately circularly. The same applies to the two sensor elements 15.1, 15.2 of the outer sensor loop 15, which surround the inner sensor loop 16. In this structure, two saturation zones 6, 8 are generated by the permanent magnets 5 (not illustrated further), which saturation zones comprise the two sensor loops 15, 16. The mutually opposing ends 15.3, 15.4; 16.3, 16.4 of the two sensor elements 15.1, 15.2; 16.1, 16.2 of a sensor loop 15, 16 therefore always form an end pair with which a transmitting element 17 is associated. In this case, a separate receiver 18, 19 for receiving the reflected pulses is associated with each end 15.3, 15.4; 16.3, 16.4 of the sensor element 15.1, 15.2; 16.1, 16.2. In the present case, two pulses are each coupled into an end pair 15.3, 15.4; 16.3, 16.4 in opposite directions by the transmitting element, which pulses are reflected back by the saturation zone 6, 8 produced in the corresponding sensor element 15.1, 15.2; 16.1, 16.2. A redundant system is produced when two sensor loops 15, 16 are used for the position measurement.

Figure 10:
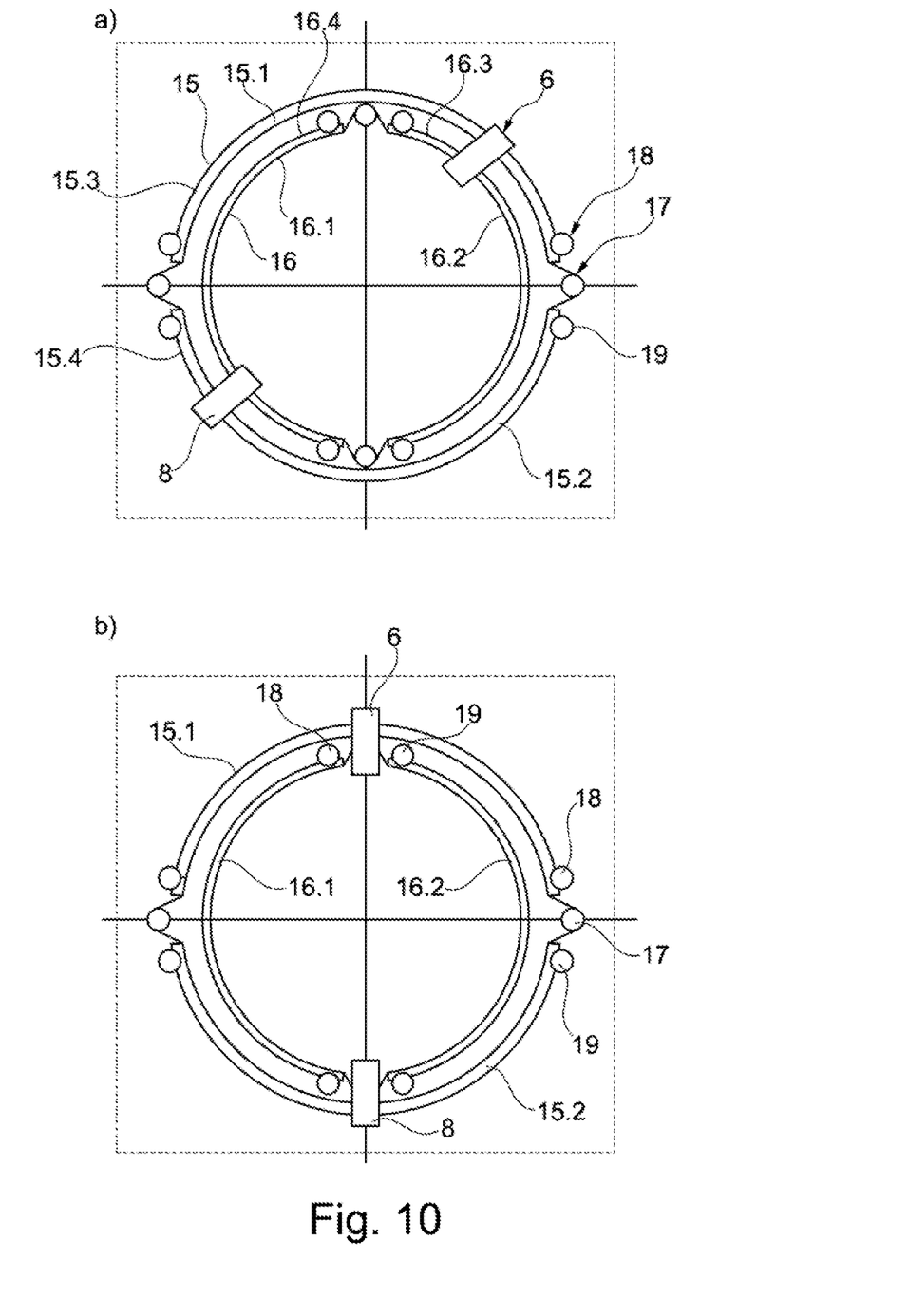
FIG. 10: a further exemplary embodiment of a magnetostrictive sensor structure for a 360° sensor.

FIG. 10 shows a further exemplary embodiment for a 360° sensor. In this case, FIG. 10a again shows the redundant system already explained in connection with FIG. 9, in which the saturation zones 6, 8 are located outside the ends 15.3, 15.4; 16.3, 16.4 of the sensor elements 15.1,15.2; 16.1, 16.2. However, if, as illustrated in FIG. 10b, the saturation zones 6, 8 are located at the level of the transmitting element 17, as denoted for the inner sensor loop 16, the pulses of the transmitting element 17 are not reflected since each pulse is detected immediately by the receiver 18, 19. The inner sensor loop 16 can therefore not be used for the measurement. A position of the rotating component can only be determined via the outer sensor loop 15.

Figure 11:
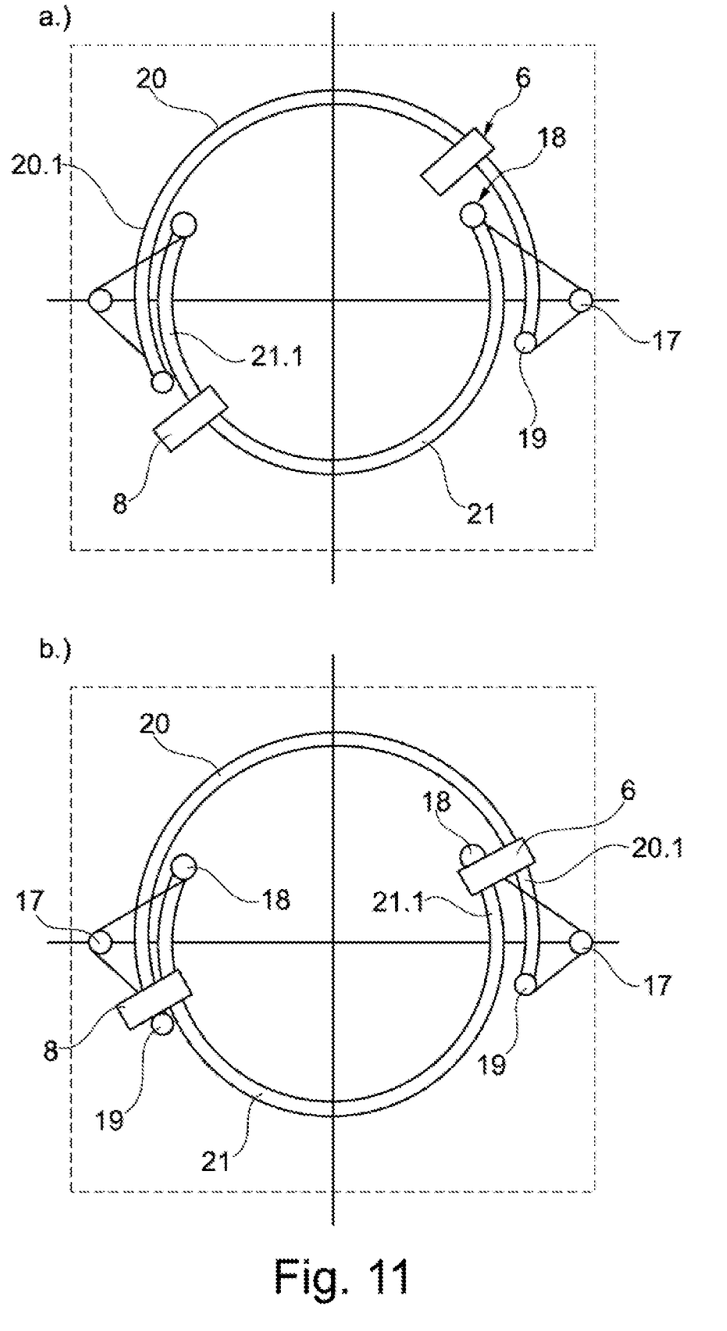
FIG. 11: a further exemplary embodiment of a magnetostrictive sensor structure for a 360° sensor.

To prevent dead zones, a further exemplary embodiment of the sensor structure 4 is illustrated in FIG. 11. In this case, both the outer 20 and the inner sensor loop 21 have only one curved sensor element, although each sensor element extends over more than 180°. In this case, the ends 20.1; 21.1 of the inner and outer sensor element 20, 21 which point in opposite directions are each supplied by only one transmitting unit 17. The mutually opposing saturation zones 6, 8 comprise only the inner sensor loop 21 (saturation zone 8) in one case and only the outer sensor loop 20 (saturation zone 6) in one case, as illustrated in FIG. 11a. In this arrangement, both the outer and the inner sensor loop 20, 21 can measure in both directions, from which reliable position determination is realized. In the structure shown in FIG. 11b, the respective saturation zone 6, 8 is formed directly behind the receiver 18 of the inner sensor loop 21 in one case and directly behind the receiver 19 of the outer sensor loop 20 in one case, wherein the saturation zones 6, 8 cover both the inner and the outer sensor loop 20, 21. This has the effect that both the inner and the outer sensor loop 20, 21 can only measure in one direction since the transmitting unit 17 is blocked by the respective saturation zone 6, 8. In this case, the coupling by the transmitting unit 17 takes place at only one end of the outer sensor loop 20 and at the opposite end of the inner sensor loop 21. A prerequisite for the measurement via such a sensor structure is that the two sensor loops 20, 21 are always formed to be larger than the saturation zones 6, 8.

Figure 12:
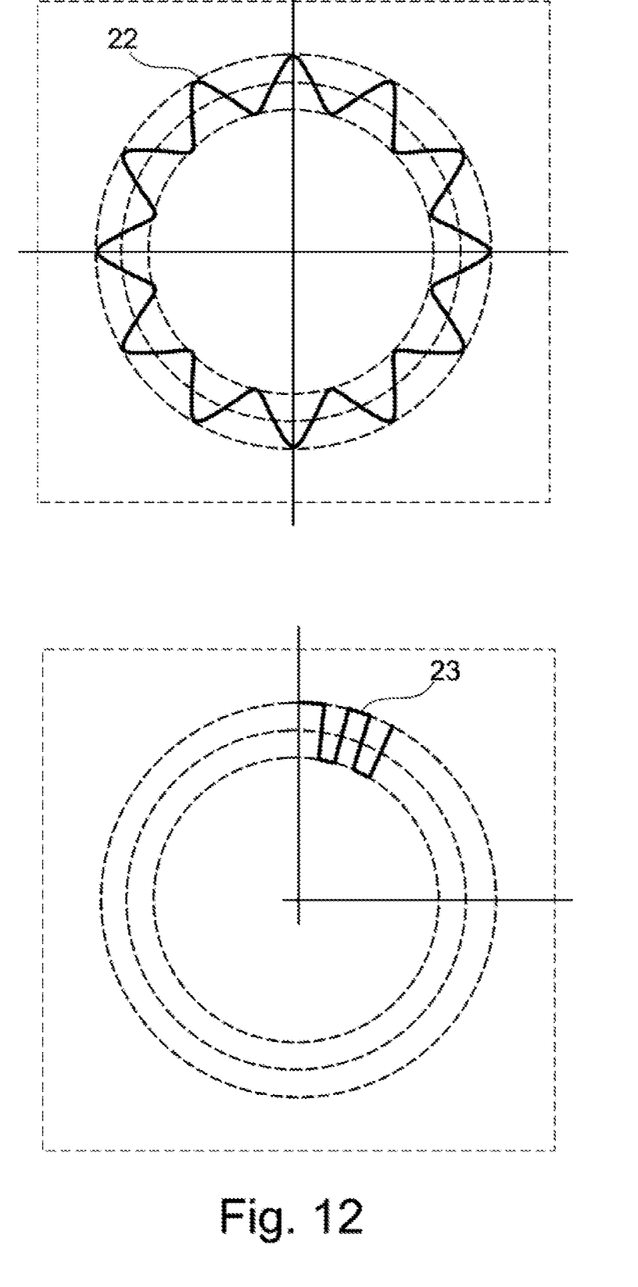
FIG. 12: an exemplary embodiment of a magnetostrictive sensor loop.

FIG. 12 illustrates two exemplary embodiments for a magnetostrictive sensor structure 22, 23 for lengthening the pulse transit distance. Since the transit time is generally in the nanosecond range, the short time is usually difficult to evaluate. The evaluation is improved if the transit distance is increased. This takes place by configuring the sensor loop 22 as a meandering structure, which enables a continuous lengthening of the sensor loop 22. FIG. 12b illustrates a meandering sensor loop 23, via which discrete pulses can be generated. By lengthening the transit time, the tolerance of the time measurement has less effect on signal errors.

With the aid of the proposed solution, angular measurement of a rotating component is enabled, in which, through variations in the two saturation zones, the tolerance of the magnetic field strength, the spacing between the magnet and sensor structure, wobbling of the magnetic ring and temperature variations can remain disregarded.

LIST OF REFERENCE SIGNS

1 Magnetostrictive displacement transducer
2 Coupling and measuring point

3 Coupling and measuring point
4 Magnetostrictive sensor structure
5 Permanent magnet
6 Saturation zone
7 Coupling and measuring point
8 Saturation zone
9 Printed circuit board
10 Block magnet
11 Block magnet
12 Axis of rotation
13 Chip
14 Electronic unit
15 Sensor loop
15.1 Sensor element
15.2 Sensor element
15.3 End of the sensor element
15.4 End of the sensor element
16 Sensor loop
16.1 Sensor element
16.2 Sensor element
16.3 End of the sensor element
16.4 End of the sensor element
17 Transmitting unit
18 Receiver
19 Receiver
20 Sensor loop
21 Sensor loop
22 Magnetostrictive sensor structure
23 Magnetostrictive sensor structure
24 Rotating Component

The invention claimed is:

1. A device for determining an angle of a rotating component, comprising:
a magnetostrictive sensor structure coupled to a plurality of transmitting elements and a plurality of receiving elements and along which a magnet that is secured to the rotating component moves;
the magnetostrictive sensor structure including:
two sensor loops at a mutual spacing, each sensor loop having a shape corresponding to a rotating direction of the rotating component; and
two saturation zones each in both sensor loops, wherein each saturation zone is formed by a magnetic field of the magnet interacting with a magnetic field of the magnetostrictive sensor structure that is generated by a current applied to the magnetostrictive sensor structure;
wherein each transmitting element is provided for simultaneously coupling two current pulses in opposite directions into one respective sensor loop, and each receiving element is positioned to receive a reflected pulse reflected by the magnet at the respective saturation zone;
wherein the receiving elements are connected to evaluation electronics configured to determine an angular position of the rotating component based on transit times for each current pulse to travel along the respective sensor loop from the respective transmitting element to the respective saturation zone and for each reflected pulse to travel along the respective sensor loop from the respective saturation zone to the respective receiving element.

2. The device as claimed in claim 1, wherein the magnet is positioned such that it is tilted with respect to the magnetostrictive sensor structure.

3. The device as claimed in claim 1, wherein the magnet secured to the rotating component is formed as a magnetic ring or from two opposing block magnets.

4. The device as claimed in claim 1, wherein the magnetostrictive sensor structure is arranged in a chip, the chip being configured to generate the current pulse and including the evaluation electronics.

5. The device as claimed in claim 1, wherein the magnetostrictive sensor structure is formed in a printed circuit board on which a chip is positioned, the chip being configured to generate the current pulse and including the evaluation electronics.

6. The device as claimed in claim 1, wherein each sensor loop includes two sensor elements curved about a center point.

7. The device as claimed in claim 6, wherein the sensor elements for each sensor loop are arranged with respect to one another to resemble a circle.

8. The device as claimed in claim 7, wherein each sensor element includes an end spaced from the respective transmitting element, the ends of the sensor elements of one of the sensor loops are arranged offset from the ends of the sensor elements of the other of the sensor loops by 90° relative to the center point.

9. The device as claimed in claim 6, wherein each sensor element includes an end spaced from the respective transmitting element, the ends of the sensor elements of one of the sensor loops being arranged, relative to the center point, radially offset from the ends of the sensor elements of the other of the sensor oops.

10. The device as claimed in claim 6, wherein the sensor elements of the sensor loops are formed in a meandering manner.

11. A device for determining an angle of a rotating component, the device comprising:
a magnetostrictive sensor structure coupled to a plurality of transmitters and a plurality of receivers and along which a magnet that is secured to the rotating component moves, the magnetostrictive sensor structure including:
first and second sensor loops spaced apart, each sensor loop having a shape corresponding to a direction of rotation of the rotating component,
a first saturation zone in the first sensor loop, and a second saturation zone in the sensor loop and spaced from the first saturation zone about an axis of rotation the rotating component, wherein the first and second saturation zones are formed by a magnetic field of the magnet interacting with a magnetic field of the magnetostrictive sensor structure that is generated by a current applied to the magnetostrictive sensor structure; and
evaluation electronics coupled to the transmitters and the receivers, wherein the evaluation electronics are configured to determine an angular position of the rotating component based on (i) a first transit time of a first current pulse being transmitted by one of the transmitters to travel in the first sensor loop to the first saturation zone and a first reflected pulse to be reflected by the magnet at the first saturation zone; and received at one of the receivers, and (ii) a second transit time of a second current pulse being transmitted by another of the transmitters to travel in the second sensor loop and a second reflected pulse to be reflected by the magnet at the second saturation zone and received at another of the receivers.

12. The device of claim 11, wherein the magnet secured to the rotating component is positioned such that it is tilted with respect to the magnetostrictive sensor structure.

13. The device of claim 11, wherein the magnet secured to the rotating component includes a magnetic ring or two opposing block magnets.

14. The device of claim 11, wherein the magnetostrictive sensor structure is arranged in a chip, the chip being configured to generate the first and second current pulses and including the evaluation electronics.

15. The device of claim 11, wherein the magnetostrictive sensor structure includes a printed circuit board on which a chip is positioned, the chip being configured to generate the first and second current pulses and including the evaluation electronics.

16. The device as claimed in claim 11, wherein each sensor loop includes a sensor element curved about a center point, each sensor element extending more than 180° about the center point.

17. The device as claimed in claim 16, wherein one sensor element is arranged concave upward relative to the center point, and the other sensor element is arranged concave downward relative to the center point.

18. The device as claimed in claim 16, wherein the sensor elements of the sensor loops are formed in a meandering manner.

19. The device as claimed in claim 16, wherein each sensor element includes two ends each spaced from the plurality of transmitting elements, the ends of one of the sensor elements being arranged, relative to the center point, radially and circumferentially offset from the ends of the other of the sensor elements.

20. The device as claimed in claim 11, wherein the first and second current pulses are transmitted in opposite directions.

* * * * *